(12) United States Patent
Goring et al.

(10) Patent No.: US 8,387,039 B2
(45) Date of Patent: *Feb. 26, 2013

(54) SYSTEM AND METHOD FOR CUSTOMIZED PROVISIONING OF APPLICATION CONTENT

(75) Inventors: Bryan R. Goring, Milton (CA); Michael Shenfield, Richmond Hill (CA); Viera Bibr, Kilbride (CA)

(73) Assignee: Research In Motion Limited, Waterloo, Ontario (CA)

( * ) Notice: Subject to any disclaimer, the term of this patent is extended or adjusted under 35 U.S.C. 154(b) by 1597 days.

This patent is subject to a terminal disclaimer.

(21) Appl. No.: 10/767,340

(22) Filed: Jan. 30, 2004

(65) Prior Publication Data

US 2005/0172281 A1   Aug. 4, 2005

(51) Int. Cl.
*G06F 9/445* (2006.01)
*G06F 9/44* (2006.01)

(52) U.S. Cl. ......... 717/177; 717/103; 717/121; 717/178

(58) Field of Classification Search .................. None
See application file for complete search history.

(56) References Cited

U.S. PATENT DOCUMENTS

| | | | |
|---|---|---|---|
| 7,134,122 B1 * | 11/2006 | Sero et al. | 717/177 |
| 7,155,715 B1 * | 12/2006 | Cui et al. | 717/177 |
| 7,207,039 B2 * | 4/2007 | Komarla et al. | 717/178 |
| 7,353,512 B2 * | 4/2008 | Katz et al. | 717/178 |
| 7,509,658 B2 * | 3/2009 | Goring et al. | 719/328 |
| 8,151,245 B2 * | 4/2012 | Oberlin et al. | 717/121 |
| 2002/0131404 A1 * | 9/2002 | Mehta et al. | 370/352 |
| 2003/0084165 A1 * | 5/2003 | Kjellberg et al. | 709/227 |
| 2003/0212991 A1 * | 11/2003 | Mahajan | 717/177 |
| 2004/0111699 A1 * | 6/2004 | Rockwell | 717/103 |

(Continued)

FOREIGN PATENT DOCUMENTS

| | | |
|---|---|---|
| EP | 1310868 A | 5/2003 |
| WO | WO 02/44892 A | 6/2002 |

(Continued)

OTHER PUBLICATIONS

Lee et al., Learning User Preferences for Wireless Services Provisioning, Jul. 2004, 8 pages, <http://delivery.acm.org/10.1145/1020000/1018782/p480.pdf>.*

(Continued)

*Primary Examiner* — Thuy Dao
(74) *Attorney, Agent, or Firm* — Gowling Lafleur Henderson LLP

(57) ABSTRACT

The current state of art for over-the-air (OTA) provisioning typically consists of a rigid set of operations that are suited to deliver a fixed content type. The runtime environment on the terminal is designed to handle a limited set of predefined content types and incapable of any content-adaptive or customized provisioning by the content provider or publisher. Systems and methods are provided for customized provisioning of an application program on a runtime environment of a terminal. The application includes application content having at least one specified content type. A method comprises: obtaining the application content by the runtime environment; and obtaining by the runtime environment a set of provisioning instructions related to the application content. The provisioning instructions are coupled to the application for specifying a provisioning API set for provisioning the application content. This method also executes the provisioning instructions for employing the API set to provision the application according to the specified content type.

28 Claims, 7 Drawing Sheets

U.S. PATENT DOCUMENTS

2004/0261086 A1* 12/2004 Jensen et al. .................. 719/328
2005/0091357 A1* 4/2005 Krantz et al. ................. 709/223

FOREIGN PATENT DOCUMENTS

WO     WO 02/075527 A     9/2002

OTHER PUBLICATIONS

O. Riva, Contory: a middleware for the provisioning of context information on smart phones, Nov. 2006, 21 pages, <http://delivery.acm.org/10.1145/1520000/1516002/p219-riva.pdf>.*

Open Mobile Alliance, "Generic Content Download Over the Air Specification, Version 1.0", Announcement Open Mobile Alliance, Jun. 20, 2002, pp. 1-42,XP-002264099, Retrieved from the Internet: URL:http://xml.coverpages.org/OMA-Download-OTA-V10-20020620.pdf>.

Nokia Corporation, "Series 60 Platform 1.0 Interoperability Overview", Aug. 1, 2002, XP002285855, Retrived from the Internet: URL:http://ncsp.forum.nokia.com/downlaods/nokia/documents/Series_60_Platform_v1_0_Interop_Overview.pdf>.

Gosling J et al, "The Java Language Environment. A White Paper", Sun Delivers Java Workshop, Oct. 1, 1995, pp. 1, 4-85, XP002042922, Sun Microsystems Computer Company, Mountain View, United States of America.

"European Search Report", Nov. 2, 2004, pp. 1-11, P36567EP/JJH, European Patent Office, Branch at The Hague Search Division.

Examination Report issued by the European Patent Office dated Jun. 1, 2006 for corresponding European Patent Application No. 04250555.2.

Examination Report issued by the European Patent Office dated Mar. 21, 2007 for corresponding European Patent Application No. 04250555.2.

Examination Report issued by the European Patent Office dated Feb. 11, 2008 for corresponding European Patent Application No. 04250555.2.

Office Action issued by the Canadian Intellectual Property Office dated May 7, 2009 for corresponding Canadian Patent Application 2,495,396.

Office Action issued by the State Intellectual Property Office of People's Republic of China dated Mar. 27, 2009 for corresponding Chinese Patent Application 200510064077.6.

Office Action issued by the State Intellectual Property Office of People's Republic of China dated Jan. 8, 2010 for corresponding Chinese Patent Application 200510064077.6.

Office Action issued by the State Intellectual Property Office of People's Republic of China dated Sep. 6, 2010, for corresponding Chinese Patent Application 200510064077.6.

* cited by examiner

SYSTEM AND METHOD FOR CUSTOMIZED PROVISIONING OF APPLICATION CONTENT

BACKGROUND

The present application relates to provisioning of applications on a terminal.

There is a continually increasing number of terminals in use today, such as mobile telephones, PDAs with wireless communication capabilities, personal computers, self service kiosks and two-way pagers. Software applications which run on these terminals increase their utility. For example, a mobile phone may include an application which retrieves the weather for a range of cities, or a PDA may include an application that allows a user to shop for groceries. These software applications take advantage of the connectivity to a network in order to provide timely and useful services to users. However, due to the restricted resources of some terminals, and the complexity of delivering large amounts of data for processing to the terminals, developing and maintaining data processing capabilities of software applications remains a difficult and time-consuming task.

The current state of art for over-the-air (OTA) provisioning typically consists of a rigid set of operations that are suited to deliver a fixed content type. The runtime environment on the terminal is designed to handle a limited set of predefined content types and incapable of any content-adaptive or customized provisioning by the content provider or publisher. The conventional provisioning process is typically carried out by software that contains certain knowledge of the downloaded content and the installation steps. Due to this built-in knowledge, the content provider and device user are left with an inflexible "one size fits all" model. The limitations of this approach can include: an inability to handle arbitrary content; an inability to dynamically extend existing applications with new features; and an inability to provide customized provisioning capabilities based on content type and/or requirements.

Disclosed herein are systems and methods of customized provisioning of application content to obviate or mitigate at least some of the above presented disadvantages.

SUMMARY

The current state of art for over-the-air (OTA) provisioning typically consists of a rigid set of operations that are suited to deliver a fixed content type. The runtime environment on the terminal is designed to handle a limited set of predefined content types and incapable of any content-adaptive or customized provisioning by the content provider or publisher. The limitations of this approach can include: an inability to handle arbitrary content; an inability to dynamically extend existing applications with new features; and an inability to provide customized provisioning capabilities based on content type and/or requirements. Contrary to current provisioning systems there is provided herein systems and methods for providing customized provisioning of an application program on a runtime environment of a terminal. The application includes application content having at least one specified content type. One such method comprises: obtaining the application content by the runtime environment of such a terminal; and obtaining a set of provisioning instructions related to the application content. The provisioning instructions are coupled to the application for specifying a provisioning API set for provisioning the application content. The method also executes the provisioning instructions for employing the API set to provision the application according to the specified content type.

A method for providing customized provisioning of an application program on a runtime environment of a terminal is disclosed, the application including application content having at least one specified content type, the method comprising the steps of: obtaining the application content by the runtime environment; obtaining by the runtime environment a set of provisioning instructions related to the application content, the provisioning instructions coupled to the application for specifying a provisioning API set for provisioning the application content; and executing by the runtime environment the provisioning instructions for employing the API set to provision the application according to the specified content type.

A terminal for providing customized provisioning of an application program on a runtime environment is also provided, the application including application content having at least one specified content type, the terminal comprising: a processing framework for obtaining the application content; a provisioning API set included in the processing framework for provisioning the application content; and a set of provisioning instructions related to the application content, the provisioning instructions coupled to the application for specifying selected ones of the provisioning API set.

Further disclosed is a method for providing customized provisioning of an application program on a runtime environment of a terminal, the application including application content having at least one specified content type, the method comprising the steps of: sending the application content for receipt by the runtime environment; sending a set of provisioning instructions related to the application content for receipt by the runtime environment, the provisioning instructions coupled to the application for specifying a provisioning API set for provisioning the application content; and making available selected ones of the API provisioning set for use by the provisioning instructions; wherein execution of the provisioning instructions employs the API provisioning set to provision the application according to the specified content type.

Also provided is a computer program product for providing customized provisioning of an application program on a runtime environment of a terminal, the application including application content having at least one specified content type, the computer program product comprising: a computer readable medium; a processing framework module stored on the computer readable medium for obtaining the application content; a provisioning module coupled to the framework module, the provisioning module configured for utilising a provisioning API set for provisioning the application content; and an interpreter module coupled to the framework module, the interpreter module configured for executing a set of provisioning instructions related to the application content, the provisioning instructions associated with the application for specifying selected ones of the provisioning API set.

BRIEF DESCRIPTION OF THE DRAWINGS

These and other features will become more apparent in the following detailed description in which reference is made to the appended example drawings, wherein.

DETAILED DESCRIPTION

Network System

Figure 1:
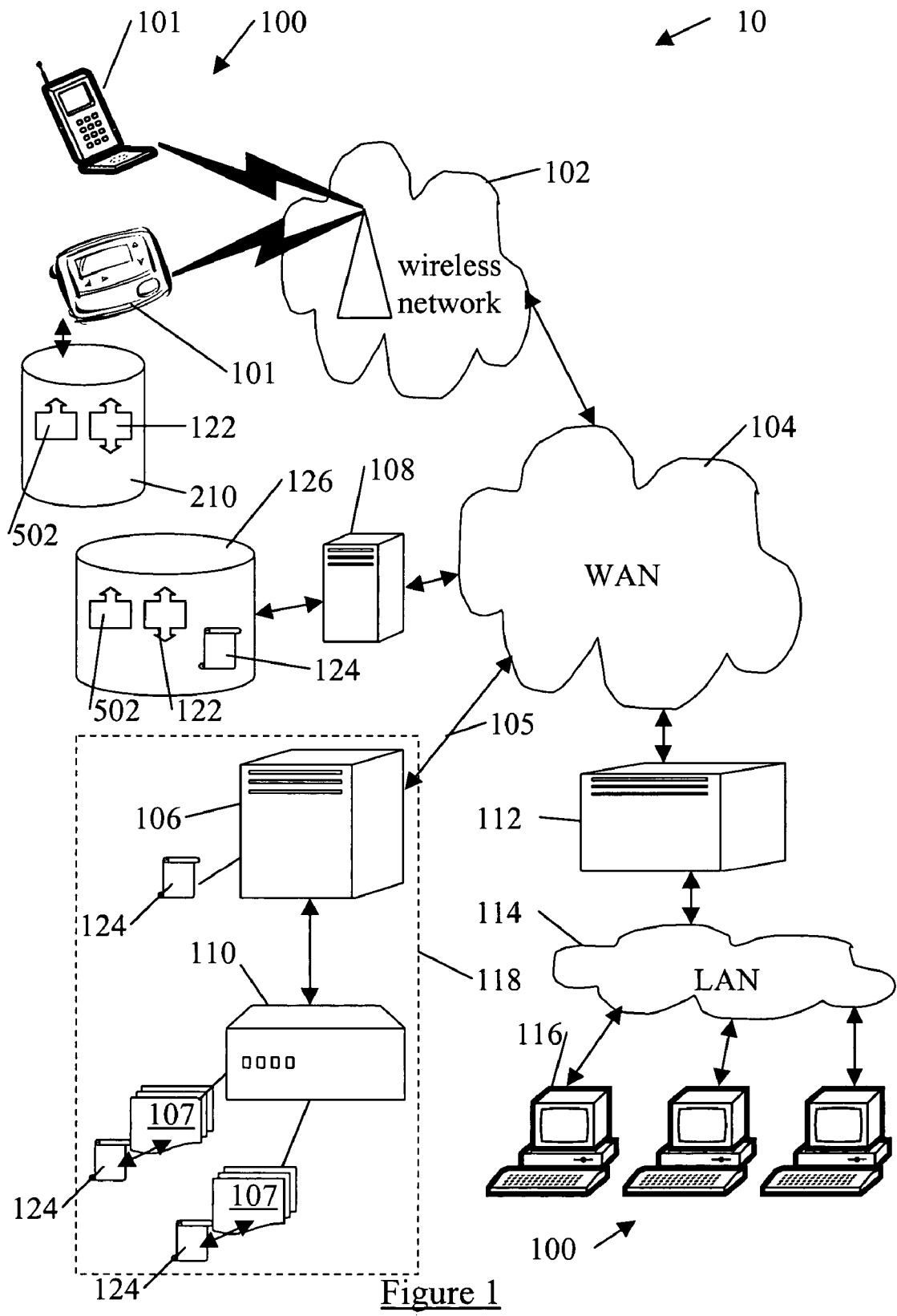
FIG. 1 is a block diagram of a network system.

Referring to FIG. 1, a network system 10 comprises a plurality of terminals 100 for interacting with one or more application servers 110 accessed by a server 106, via a coupled Wide Area Network (WAN) 104 such as but not limited to the Internet. These generic terminals 100 can be such as but not limited to wired devices such as personal computers 116, wireless devices 101, PDAs, self-service kiosks and the like. The server 106 provides access to application programs 107 through messages 105. The system 10 provides the capability of the terminal 100 to provision the content of the application program 107, such as but not limited to expressed in a structured definition language (e.g., XML), that has associated provisioning instructions 124 for interacting with various provisioning Application Program Interfaces (API) 122 used by a provisioning service 308 of a processing framework 206 (see FIGS. 2 and 3). The provisioning instructions 124 represent a customizable provisioning scheme tailored to the desired implementation of the application 107 on the terminal 100. The instructions 124 can be code/script and/or provisioning data such as an XML definition.

The content of the application 107 is provisioned on the terminal 100 according to the associated customized provisioning instructions 124, such as but not limited to supplied by the content provider (for example the server 110) or publisher (not shown). Accordingly, the content has provisioning control to help specify the requirements and actions of application 107 provisioning through the associated provisioning instructions 124. Further, the Framework 206 shares the provisioning control of the application 107 by recognizing the content provisioning control and customizing the provisioning process of the framework to accommodate. The framework 206 provides the capability to request the provisioning API 122 as needed, and address that API 122 tailored to content type of the application 107. The framework 206 can be referred to as a union of collaborating modules that collectively provision, store and evaluate applications 107.

The provisioning API 122 requested by the provisioning instructions 124 could be retrieved locally (terminal 100 storage) or remotely for example from an API repository/database 126 accessed through a repository server 108. Alternatively, the remote server 106 could push the provisioning API 122 on demand, or in connection with delivery of application 107, to the terminal 100 in conjunction with the needed customized API 122 of the provisioning instructions 124 of the application 107. It is recognized that XML represents only one example of a structured definition language that can be used to define the content of the application 107. Other example languages can include, without limitation, HTML, XHTML, XSML, RDF, Machine Readable Cataloging (MARC), and Multipurpose Internet Mail Extensions (MIME). It is recognized that the system 10 can be suitable to any range of defined applications 107 to be used in conjunction with terminals 100 that may be limited in terms of connectivity, memory and/or storage. It is further recognized that the servers 106, 108, 110 could be implemented by a service provider 118 providing a schema defined service, such as a web service by example. A single environment could provide all server 106, 108, 110 functionality in a single computer system, or across multiple computer systems.

The system 10 operates such that the application 107 and the framework 206 have separate but operatively coupled provisioning control (e.g. application provisioning intelligence) of the provisioning process. The first area of intelligence is with the Content of the application 107, which contributes to the specification of the requirements and actions of provisioning through the provisioning instructions 124. The remaining intelligence is with the framework 206, which provides the provisioning service 308 and associated provisioning API 122 (see FIG. 3). Optionally, the framework 206 can also include an extension module 314 that allows introduction of specific API 122 access for provisioning the content type associated with the application 107. The shared provisioning control of the application 107 and framework 206 is adaptable according to the selected provisioning instructions 124 and the correspondingly selected provisioning API 122 available over the network 104 of the system 10.

Further, it is recognised the system 10 can also have a gateway server 112 for connecting the desktop terminals 116 via a Local Area Network (LAN) 114 to the server 106. Further, the system 10 can have a wireless network 102 for connecting the wireless devices 101 to the WAN 104. It is recognized that other terminals and computers (not shown) could be connected to the server 106,108 via the WAN 104 and associated networks other than as shown in FIG. 1. The generic terminals 100, wireless devices 101 and personal computers 116 are hereafter referred to as the terminal 100 for the sake of simplicity. Further, the networks 102, 104, 112 of the system 10 will hereafter be referred to as the network 104, for the sake of simplicity. It is recognized that there could be multiple servers 106, 108, 110, and/or that the functionality of the servers 106, 108 and/or 110 could be combined in various configurations, if desired.

Generic Terminal

Figure 2:
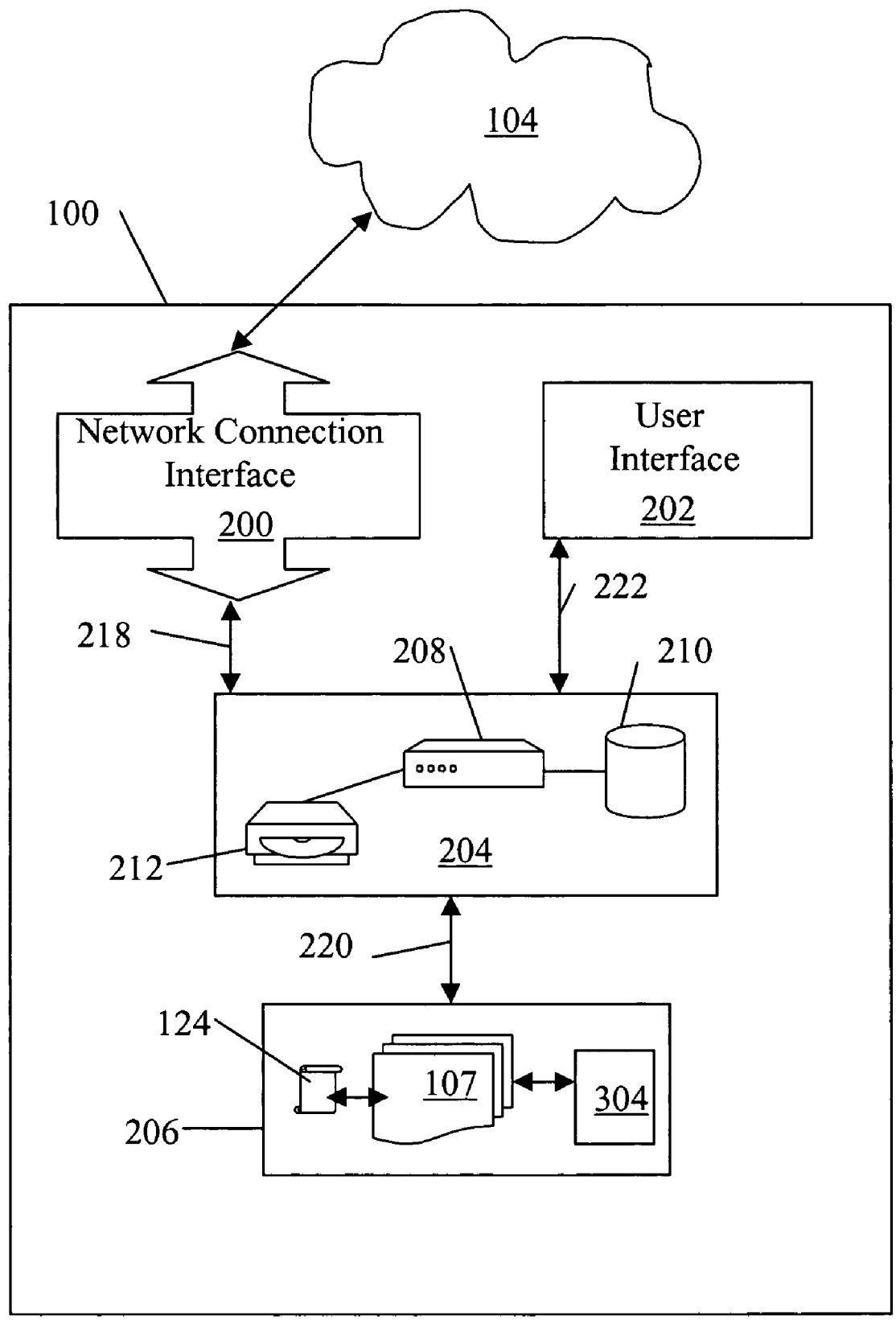
FIG. 2 is a block diagram of a generic terminal of FIG. 1.

Referring to FIG. 2, the terminals 100 are such as but not limited to mobile telephones (or other wireless devices), PDAs, two-way pagers or dual-mode communication terminals. The terminals 100 include a network connection interface 200, such as a wireless transceiver or a wired network interface card or a modem, coupled via connection 218 to a terminal infrastructure 204. The connection interface 200 is connectable during operation of the terminals 100 to the network 104, such as to the wireless network 102 by, for example, IR links, RF links, etc. (see FIG. 1), which enables the terminals 100 to communicate with each other and with external systems (such as the server 106—see FIG. 1) via the network 104 and to coordinate the requests/response messages 105 between the terminals 100 and the servers 106, 110. The network 104 supports the transmission of the provisioning API 122 in the requests/response messages 105 between terminals 100 and external systems, which are connected to the network 104. The network 104 may also support voice communication for telephone calls between the terminals 100 and terminals which are external to the network 104. A wireless data transmission protocol can be used by the wireless network 102, such as but not limited to DataTAC, GPRS or CDMA.

Referring again to FIG. 2, the terminals 100 also have a user interface 202, coupled to the terminal infrastructure 204 by connection 222, to facilitate interaction with a user (not shown). The user interface 202 can include one or more user input devices such as but not limited to a QWERTY keyboard, a keypad, a trackwheel, a stylus, a mouse, a microphone and the user output device such as an LCD screen display and/or a speaker. If the screen is touch sensitive, then the display can also be used as the user input device as controlled by the terminal infrastructure 204. The user interface 202 is employed by the user of the terminal 100 to coordinate the requests/response message messages 105 over the system 10 (see FIG. 1) as employed by the processing framework 206.

Referring again to FIG. 2, operation of the terminal 100 is enabled by the terminal infrastructure 204. The terminal infrastructure 204 includes the computer processor 208 and the associated memory module 210. The computer processor 208 manipulates the operation of the network interface 200, the user interface 202 and the framework 206 of the communication terminal 100 by executing related instructions, which are provided by an operating system; the computer processor 208 can include one or more processing elements that may include one or more general purpose processors and/or special purpose processors (e.g., ASICs, FPGAs, DSPs, etc). Further, it is recognized that the terminal infrastructure 204 can include a computer readable storage medium 212 coupled to the processor 208 for providing instructions to the processor for loading/updating client application programs 107, the provisioning instructions 124 and the provisioning API 122. The computer readable medium 212 can include hardware and/or software such as, by way of example only, magnetic disks, magnetic tape, optically readable medium such as CD/DVD ROMS, and memory cards. In each case, the computer readable medium 212 may take the form of a small disk, floppy diskette, cassette, hard disk drive, solid state memory card, or RAM provided in the memory module 210. It should be noted that the above listed example computer readable mediums 212 can be used either alone or in combination.

Processing Framework

Figure 3:
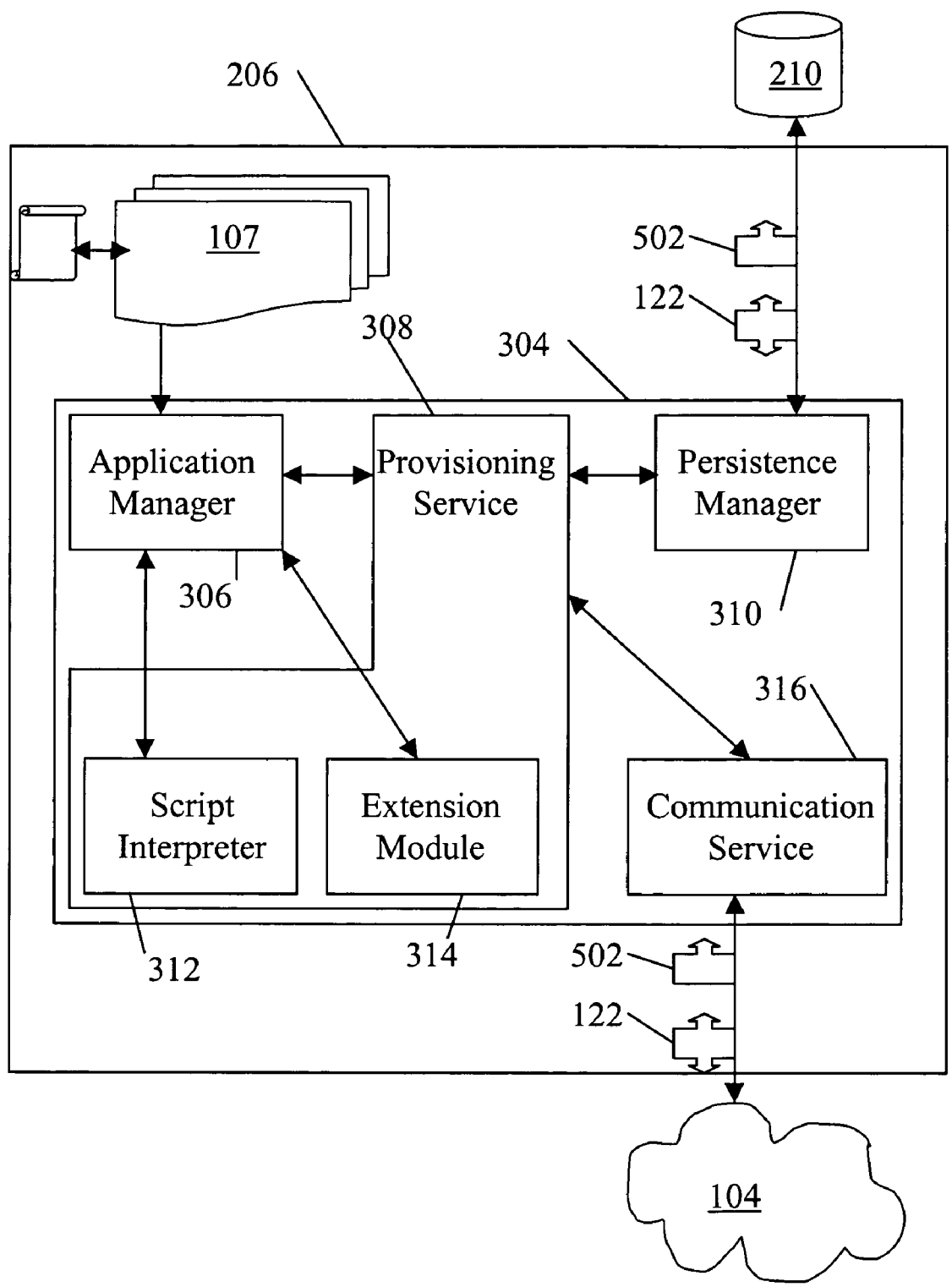
FIG. 3 shows a processing framework of the terminal of FIG. 2.

Referring to FIG. 3, the framework provides the provisioning service 308 and associated provisioning API 122. Optionally, the framework 206 can also include an extension module 314 that allows introduction of specific API 122 access for provisioning the content type associated with the application 107. A client runtime environment is provided by the processing framework 206. Multiple such runtime environments could potentially be available for use by the processing framework 206 of a given terminal 100. The framework 206 of the terminal 100 is coupled to the infrastructure 204 by the connection 220 and is an interface to the terminal 100 functionality of the processor 208 and associated operating system of the infrastructure 204. The client runtime environment of the terminals 100 is preferably capable of generating, hosting and executing client application programs 107 on the terminal 100; if multiple runtime environments are available, a particular one can be selected for use with a given application program 107. Further, specific functions of the client runtime environment can include such as but not limited to service framework 304 support for language, coordinating memory allocation, networking, management of data during I/O operations, coordinating graphics on an output device of the terminals 100 and providing access to core object oriented classes and supporting files/libraries. Examples of the runtime environments implemented by the terminals 100 can include such as but not limited to Common Language Runtime (CLR) by Microsoft and Java Runtime Environment (JRE) by Sun Microsystems. It is recognised that the components of the processing framework 206 can include software, hardware or a combination thereof.

The processing framework 206 manages the application 107 provisioning, retrieving and removing from the runtime environment of the terminal 100. The processing framework 206 provides ability to dynamically manage the provisioning API 122. It is recognized that the control of provisioning the content of the application 107 is distributed between the application 107 through the provisioning instructions 124 and the provisioning service 308 of the Framework 206, which represents the separation as Application 107 Intelligence and Framework 206 Intelligence. Having made this separation, the application 107 may no longer be bound by static provisioning procedures that would normally be imprinted on terminal 100 prior provisioning procedures.

The Framework 206 provisioning control is responsible for recognizing application 107 provisioning intelligence and customizing the provisioning process to accommodate. The framework 206 provides the capability to request the provisioning API 122 needed, and address those API 122 with the specified content type of the application 107. Specific actions of the framework 206 can include such as but not limited to: recognising the API 122 required for the Content of the application 107 (as specified by the provisioning instructions 124 for example); lookup of the API 122 on the terminal 100 or via the network 104; downloading the API 122 from the specified remote network 104 location if needed; and removing or otherwise suspending/caching the API 122 no longer required by the terminal 100 (such as in the case of an application program upgrade). In the environments with centralized management of the terminals 100 is being enforced (e.g. corporate space), a central server (not shown) could initiate removal of obsolete API 122 on the respective terminals 100.

Referring again to FIG. 3, the Processing Framework 206 can provide generic service framework 304 functionality as part of, or separate from, the application program 107 such as but not limited to; an Application Manager 306, the optional provisioning extension module 314, the Provisioning service 308, a Communication Service 316, a provisioning Script Interpreter 312, and a Persistence Manager 310. Other services (not shown) can include a presentation service, a terminal access service and a security manager. It is recognised that separate service 304 functionality can be shared by a plurality of application programs 107, or can be represented as a series of respective services 304 on an application 107 per application 107 basis.

Referring again to FIG. 3, the communication service 316 manages connectivity between the terminals 100 and the servers 106,110 via the network 104, including the ability to send and receive data in the framework 206 and to fetch remotely stored API 122 as required. The persistence manager 310 allows the API 122 to be locally stored in the memory module 210. The provisioning service 308 co-ordinates the process of provisioning the application 107 into the Framework 206. The Provisioning Service 308 can represent the application 107 in a format that is recognized by the Application Manager 306 for evaluation/execution in the runtime environment, as further described below. The Application Manager 306 can be used to interact with the user interface 202 (see FIG. 2), manages application lifetime, etc. The Application Manager 306 can also evaluate the internal representation of the Content of the application 107 as provisioned. The optional Extension Module 314 can offer a requested API 122 to the Provisioning Service 308 to operate on the content. The provisioning Script Interpreter 312 can interpret the Provisioning instructions 124 and direct provisioning actions. Further, the provisioning API 122 can be referred to as an arbitrary set of operations utilized by the Provisioning Service 308 to perform customized application

107 provisioning. The Provisioning API 122 can be offered by the Extension Module 314.

Optionally, the framework 206 can include the Security Manager that may perform validation of provisioning tasks, the Screen Manager that may interact with the Framework user to collect required provisioning data, and the terminal Access Service that may be used to interrogate terminal specific information required to complete provisioning. It is recognized that other configurations of the processing framework 206 with respective services 306, 308, 310, 312, 314, 316 for implementing the application 107 provisioning can be other than shown, as desired. Further, it is recognized that the framework 206 can be part of the operating system of the terminal infrastructure 204.

Figure 4:
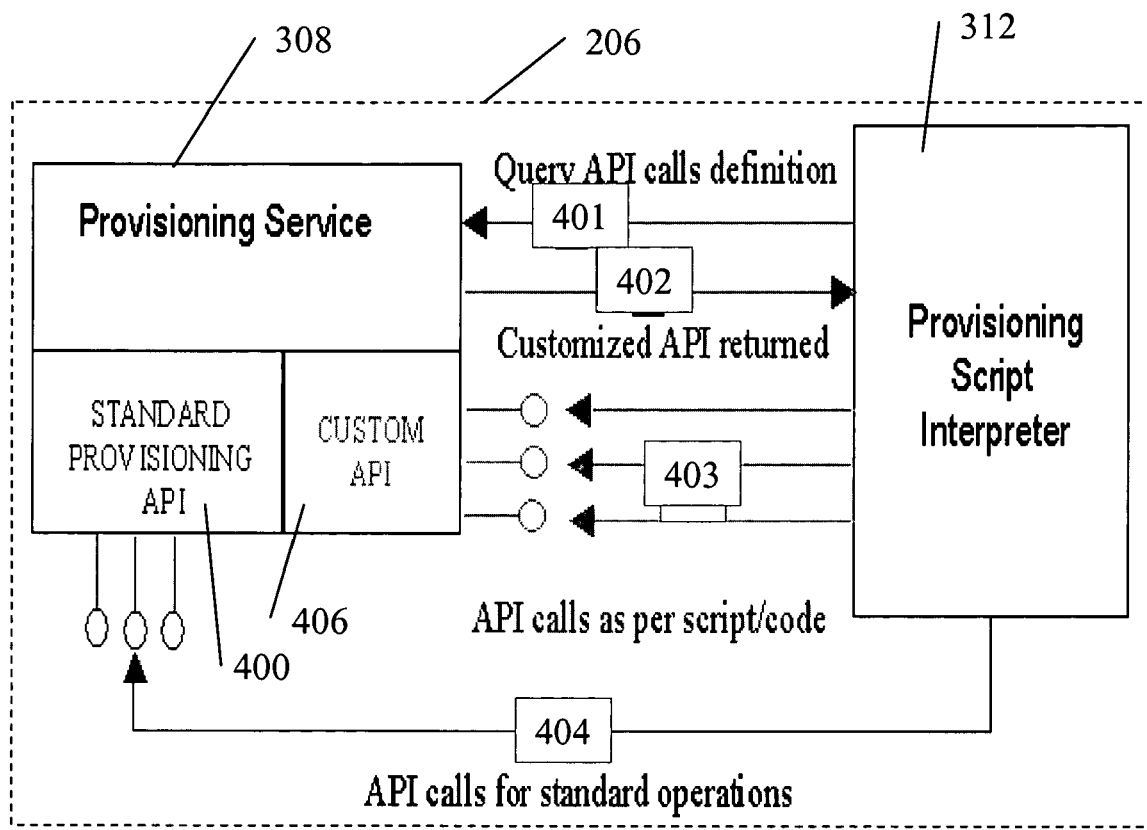
FIG. 4 is a provisioning service presentation of API's of FIG. 3.

Referring to FIG. 4, the provisioning service 308 of the framework 206 has the capability to query for the desired API required at provisioning time. Further, the Provisioning Service 308 optionally can have the capability to query for a particular API set/Content Type combination, according to the provisioning instructions 124 given to the application 107 as a series of code and/or script. This facility is utilized by generic content of the application 107 to dynamically request the appropriate API be made available for its provisioning procedure, further described below in relation to FIG. 6. The Provisioning Service 308 may provide a built in API set 400 to satisfy a standard provisioning procedure. Custom APIs sets 406 are made available to the provisioning script interpreter 312 on request. The steps for this procedure are as follows:

1) The provisioning script interpreter 312 queries 401 for the API 122 definition of interest;
2) The customized API 406 is returned 402;
3) The provisioning script interpreter 312 makes calls 403 to the custom API 406 as required; and
4) The provisioning script interpreter 312 makes calls 404 for standard provisioning API 400 operations as required.

It is recognized that the above described architecture of FIG. 4, regarding an example of the provisioning instructions 124 as code/script, could be adapted to provision the application 107 content via the provisioning instructions 124 defined as provisioning Data, or as a combination thereof.

Customized Provisioning

To provide customized provisioning capability, the provisioning control of the application 107 on the terminal 100 is distributed between the application 107 (through the provisioning instructions 124) and the framework 206. This separation of control as Application 107 provisioning control (Intelligence) and Framework 206 provisioning control (Intelligence) helps the application 107 to be no longer bound by a static provisioning procedure that would normally be implemented by current terminals 100.

Framework 206 Intelligence

The Framework 206 is responsible for recognizing application 107 provisioning intelligence and customizing the provisioning process to suit it, as described above. The framework 206 provides the capability to request the provisioning API 122 required, and address that API 122 with any content type.

Application 107 Intelligence

Application control implies that the content of the application 107 is able to influence, through the coupled provisioning instructions 124, the operations conducted at provisioning time. Application intelligence in the form of the provisioning instructions 124 may take on three general forms: a separate unit of provisioning code (provisioning script); a set of provisioning data; or a combination thereof.

Provisioning Script

A Provisioning Script, as the provisioning instructions 124, represents a distinct unit of executable instructions that can direct the Framework 206 during provisioning. The Provisioning Script relies on the fact that the Framework 206 makes available the appropriate API 122 to satisfy provisioning operations. The Framework 206 provides the API 122 of choice, as specified by the script, suitable to the content type(s) of the application 107.

Embedded Script

A provisioning script, as the provisioning instructions 124, may be attached to the content of the application 107 at download time to the terminal 100 (for example from the server 106—see FIG. 1). The script is immediately available to be executed within the Framework 206.

External Script

It may be desirable to reuse a particular provisioning script. In this case, the script may be separated from the Content of the application 107 and requested by the Provisioning Service 308 (see FIG. 3) at provisioning time. The script (i.e. the provisioning instructions 124) could be fetched either remotely or locally as circumstances dictate.

Provisioning Configuration Data

Provisioning Data consists of an arbitrary set of properties, which can be referred to as an embedded or otherwise coupled version of the provisioning instructions 124, that may be specified in the content of the application 107. This approach to application 107 intelligence relies on the fact that the Framework 206 recognizes the set of possible properties and modifies the provisioning process to suit customized settings. It is recognised that the provisioning data could be designed as external to the content of the application 107.

Arbitrary Provisioning API, Generic Content Provisioning

Figure 5:
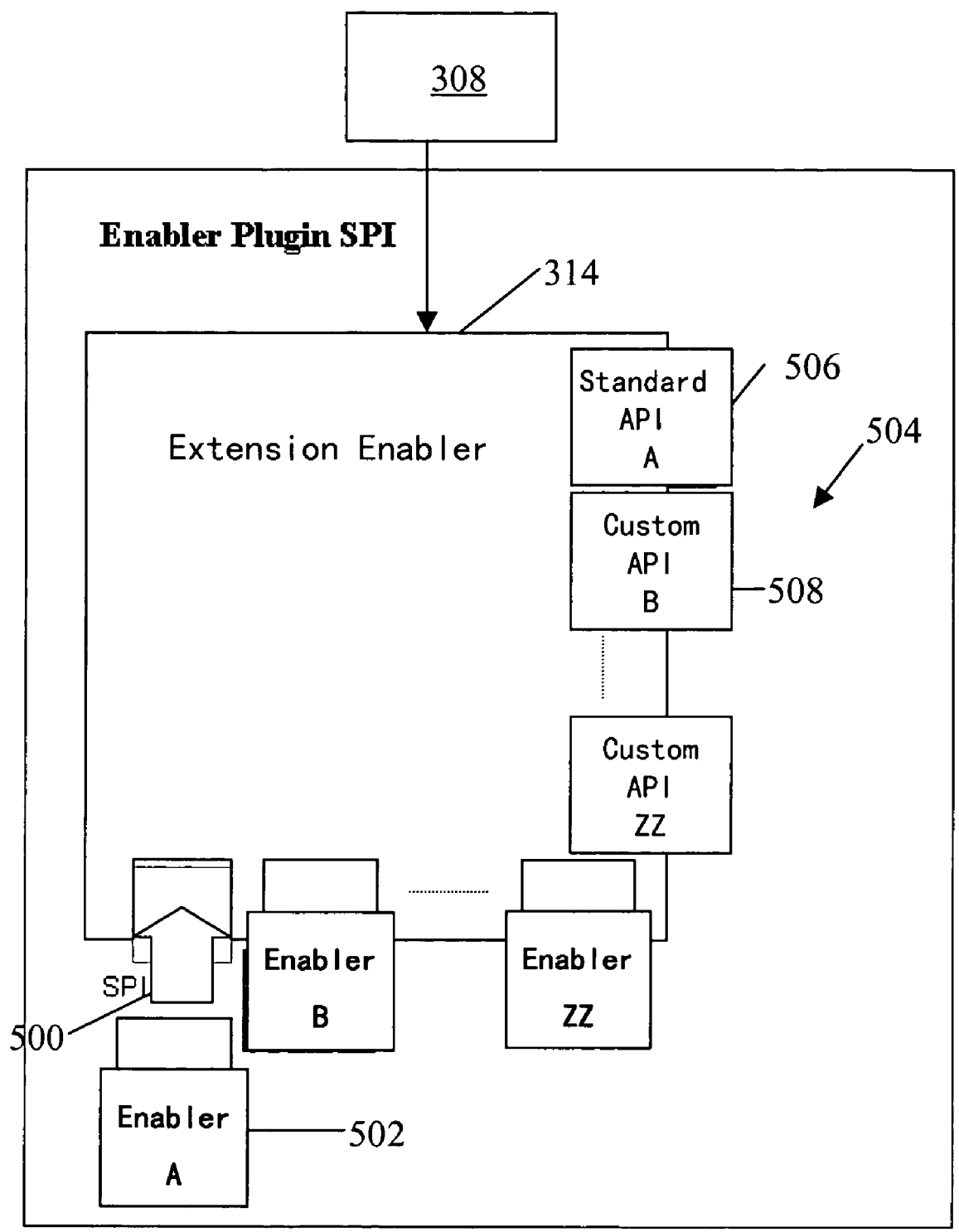
FIG. 5 is an illustration of an Enabler plugin SPI of the framework of FIG. 3.

A further example of the system framework 206 is provisioning Generic Content (GC) of the application 107 via an arbitrary set of provisioning operations. Accordingly, the provisioning process is detached from how the GC is embodied (the content type) in the application 107. Referring to FIG. 5, the Framework 206 (see FIG. 2) is enhanced to provide the Extension Module 314 and a generic Provisioning Service 308 that offers API querying coupled to content type(s) of the application 107.

The Extension Module 314 provides a Service Provider Interface (SPI) 500 to plug-in handlers or enablers 502 for API extensions. The API extensions in this case are distinct provisioning API sets 504. The ability to address a particular API choice of the set 504 to provision a desired content type of the application 107 is supplied through the appropriate enabler 502. The provisioning service 308 offers the capability to query for the desired generic API from the set 504 required at provisioning time. It should be recognised that the generic API 504 are each able to interact with a generic content, i.e. each API 504 can interact with a variety of different content types through a predefined generic content type interface, such as but not limited to transforming the data of the content type to a generic representation format recognisable by the generic API 504. The enabler 502 would be in this case a translation mechanism between a specific content type of the application 107 and the generic processing capabilities of the API 504. The Extension Module 314 permits a service provider to register the API enabler 502 on the terminal 100 for selected content types and selected API 504. The Extension Module 314 allows use of a particular provisioning API 504 for provisioning of a generic content type (defined as a specific type through the specified enabler 502). The Extension Module 314 typically implements a standard API set 506 for the most common set of operations, the so-called Standard Provisioning API A of FIG. 5. The Extension Module 314 also contains custom API 508, which can be made available according to the provisioning instructions 124 (see FIG. 3) which would contain a reference to the custom API 508 needed to provision the application 107. These custom API 508 could be obtained either locally on the terminal 100 if available or remotely such as on the repository 126 (see FIG. 1).

Generic Content Type

The Framework 206 that conducts the provisioning process is now insensitive to the type of the GC. This property is imparted through introduction of the plugin SPI 500 for API Extensions (through the enablers 502). The enablers 502 are available for digestion of a predefined content type (such as one per enabler 502) for presenting to the generic provisioning API 504 selected by the provisioning service 308.

Plugin SPI 500

The plugin SPI 500 for API Extensions provides the capability for Service Providers to introduce enablers 502 to the Extension Module 314, i.e. the SPI 500 provides an interface for connecting the enablers 502 to the Extension Module 314. As plugin enablers 502 may apply to new content types, the plugin SPI 500 provides the capability of the Extension Module 314 to dynamically extend the processing scope of the Framework 206. Referring to FIGS. 1 and 3, it is recognized that the Extension Module 314 can search for or otherwise obtain unavailable or new enablers 502 from the local storage 210 or remotely from such as the repository 126.

API Enabler

Referring to FIG. 5, the enabler 502 is an instructional component that provides access to a desired API 504 for provisioning a predefined content type for the respective enabler 502. The enabler can be written by the service provider 118 (see FIG. 1) and integrated with the Extension Module 314 via the plugin SPI 500. The enabler 502 can therefore be referred to as an executable unit that executes provisioning instruction requests (such as code and/or script) in the context of the known content type to which the enabler 502 is assigned. The enabler 502 performs the requested function on the provisioning API, and operates on its known content type as is appropriate to fulfilling the requests. There are such as but not limited to three ways in which a required enabler 502 may be resolved:

- the enabler 502 for the selected content type of the downloaded application 107 is already installed in the framework 206 and is therefore known to the Extension Module 314;
- the enabler 502 for the selected content type of the downloaded application 107 is bundled with a provisioned content descriptor (e.g. header-like document describing the requested content) of the application 107. The Framework 206 installs this enabler 502 as a preliminary step in the provisioning process; and
- the Extension Module 314 has the capability to dynamically provision the enabler 502 from the location specified in the content descriptor. The enabler 502 is downloaded and installed via the SPI 500 as a preliminary step in the provisioning process.

EXAMPLE

Provisioning of Ringtones vs Game Application

Consider the case where a custom generic "Provisioning Compression API" 504 exists that provides ability to compress data at installation time. This API 504 provides an operation called flatten( ). A selected enabler "A" is provided that operates on content type A: ringtone data, and a separate enabler "B" operates on the game (i.e. content type B). The provisioning script included with both enablers 502 make use of the same generic compression API 504.

During provisioning of the ringtone, the provisioning service 308 makes a request for the Provisioning Compression API's flatten( ) operation. In this case, enabler A extracts the sound bytes of the ringtone description and passes them to the flatten( ) method for compression. During provisioning of the game, enabler B extracts graphic and sound sequences from the game content description and passes those to the same flatten( ) for compression. It should be recognised that only one version of the generic API 504 is used to process multiple different content types.

Sample Extension Module 314 Configuration

Consider the case where the Extension Module 314 offers two provisioning API's.

API.A—the standard provisioning API 506 (see FIG. 5) and

API.B—an enhanced provisioning API 508.

Two types of GC are to be provisioned:

new content type X known content type Y

In this scenario, Enabler A addresses access to the standard API.A for provisioning content type X and Enabler B addresses access to new API.B (contained) for a known content type Y. It is recognized that this example could be extended to support any set of provisioning operations for any content type.

Sample Provisioning Procedure

Figure 6:
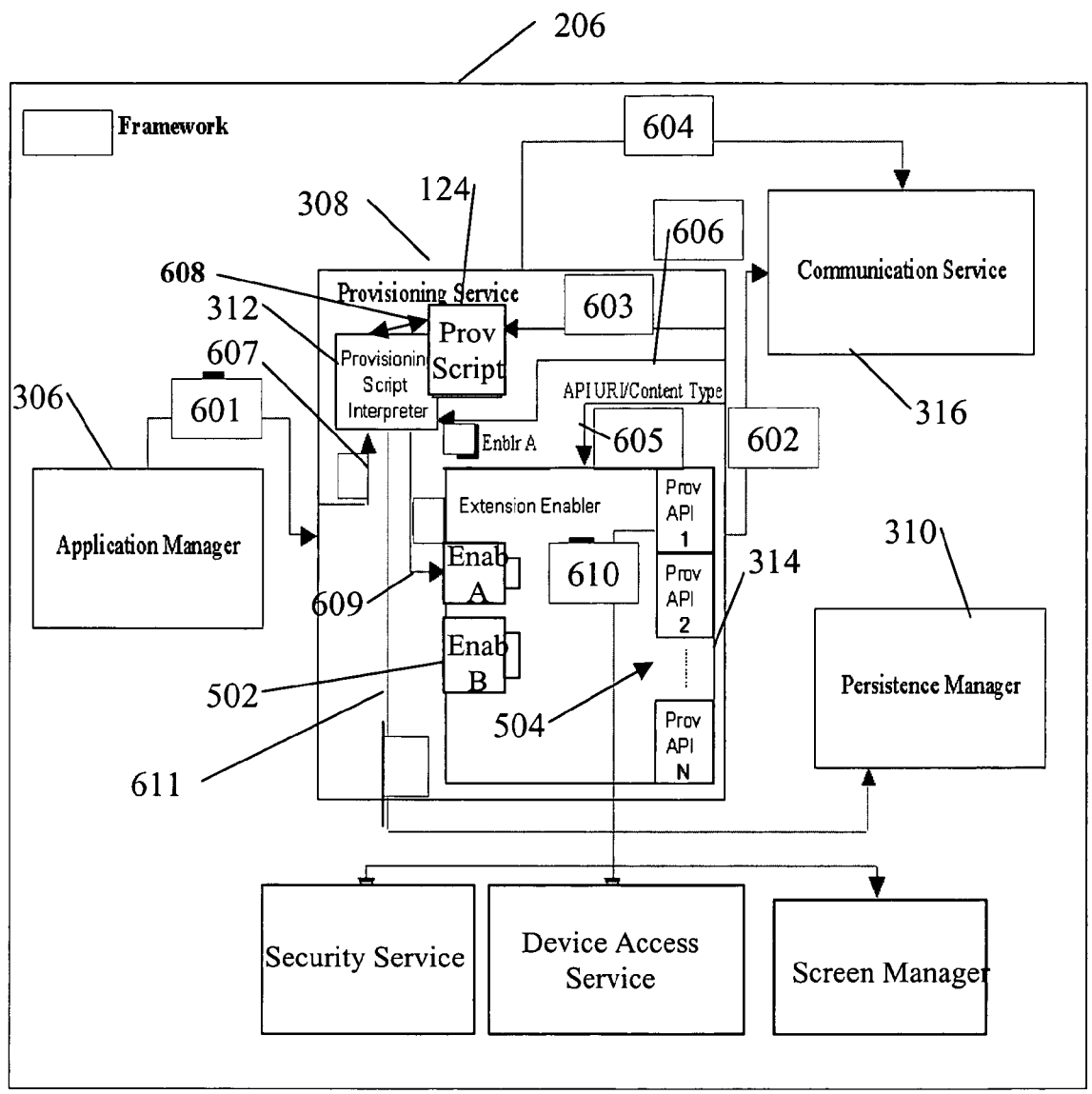
FIG. 6 illustrates the provisioning process via provisioning instructions for the service of FIG. 4.

The following procedure illustrates the Generic Provisioning Model using application intelligence specified via the provisioning instructions 124. Referring to FIG. 6;

1) Application Manager 306 requests 601 the Provisioning Service 308 to download and install Generic Content;
2) The Provisioning Service 308 fetches 602 the GC via the Communication Service 316;
3) The Provisioning Service 308 inspects 603 the GC to see if it contains the provisioning instructions 124 (embedded). If so, step 604 is skipped;
4) The Provisioning Service 308 fetches 604 the provisioning instructions 124 via the Communication Service 316;
5) The provisioning instructions 124 specifies 604 the Provisioning API 504. The content type is known from the type of GC downloaded. The Extension Module 314 is queried for the plugin enabler 502 that provides access to the provisioning API 504 desired for the GC content type. The means by which a plugin enabler 502 may be acquired has been discussed above;
6) The Extension Module 314 is registered 606 to the Provisioning Script Interpreter 312 for future provisioning API calls;
7) The Provisioning Service 308 kicks off 607 the provisioning process by calling the Provisioning Script Interpreter 312;
8) The Provisioning Script Interpreter 312 executes 608 provisioning steps required by the instructions 124;
9) The Provisioning Script Interpreter 312 directs 609 calls for provisioning API functionality to the exposed enabler 502 of the Extension Module 314 corresponding to the content type of the GC;
10) The Provisioning API 504 thus addressed may utilize 610 associated Framework 206 modules to supply operations such as but not limited to,
    a. validation of dependencies, size, version, compatibility etc., b. performance of security checks, c. user interactions, required user data collection, and d. device and environment info interrogation;

11) The Provisioning Script Interpreter 312 in conjunction with the appropriate API 504 digests 611 the generic content and persists it locally in a format suitable to Application Manager 306 evaluation.

In view of the above, a system 10 of adaptable provisioning is described with the capabilities of the ability to customize the provisioning process (dynamic) and neutrality to application content type (generic). To facilitate the adaptable provisioning scheme, the system 10 uses: application 107 defined provisioning; framework 206 managed provisioning API; and optionally provisioning extension enablers 502.

Provisioning Extensibility Example

Figure 7:
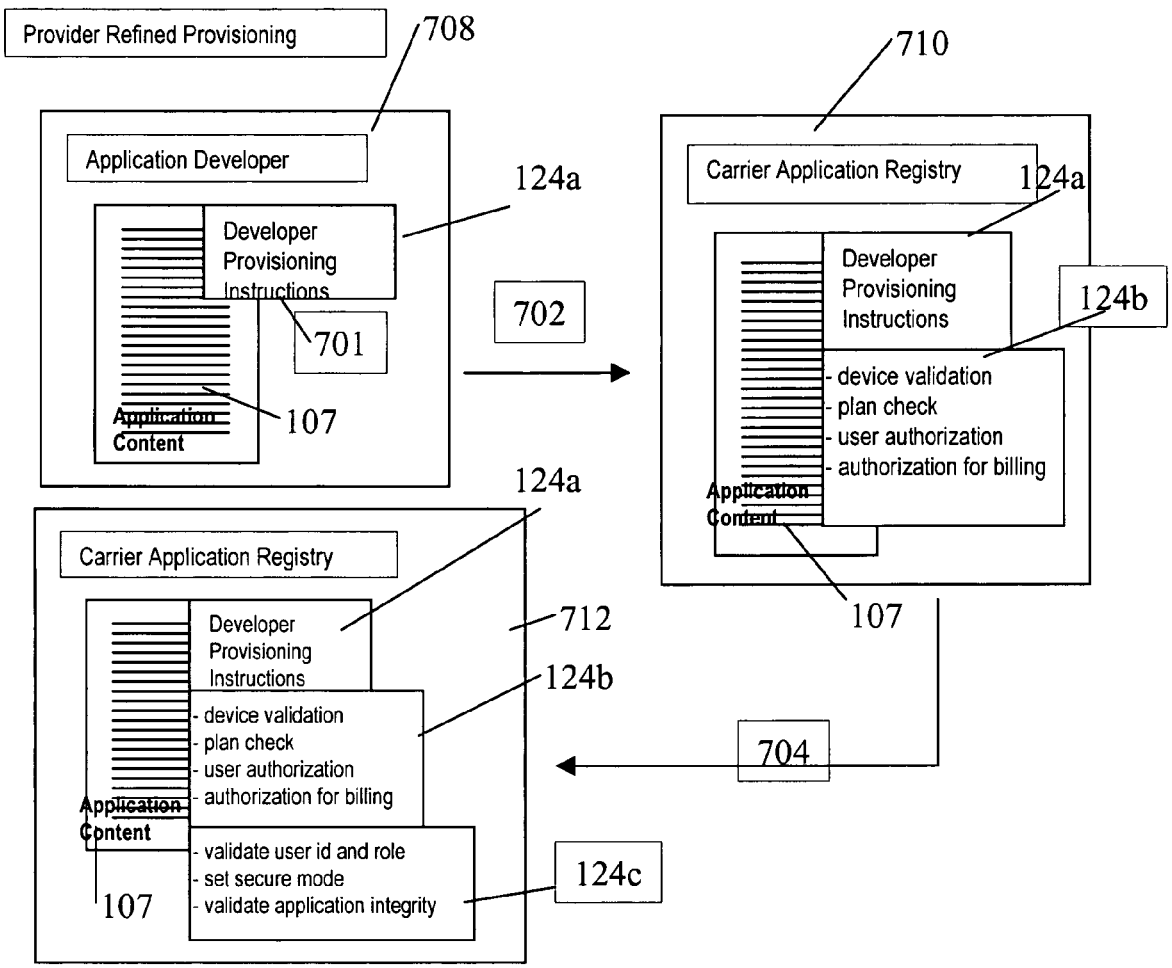
FIG. 7 illustrates refinement of the application provisioning steps shown in FIG. 6.

Given the capabilities of the system 10 a general application of dynamic provisioning can be illustrated. This is the ability to enhance or otherwise adapt the provisioning instructions 124 as an application 107 is deployed throughout a network of collaborating parties. This approach is presented through the following example Provider Refined Provisioning Process with reference to FIG. 7.

1) In this example, the developer 708 of a particular application 107 provides 701 a set of generic provisioning instructions 124*a*.

2) The application 107 is now transferred 702 to a carrier registry 710 on offer to corporate clients.

3) As the carrier 710 has certain requirements as part of normal operating procedure, the provisioning instructions 124*a* are enhanced to include further instructions 124*b* as appropriate.

4) A corporation interested in this particular application 107 installs 704 it into their own corporate registry 712.

5) Due to requirements for corporate privacy, for instance, the provisioning instructions 124*a,b* are again updated to reflect additional policy 124*c*.

6) When the corporate user ultimately requests installation of the application 107, the refined provisioning instructions 124*a,b,c* are executed including instructions from the developer 708, carrier 710 and corporation 712.

The end result is the application 107 having the same generic content, and a customized provisioning procedure that suits the needs of the corporation 712.

The above description relates to one or more exemplary systems and methods. Many variations will be apparent to those knowledgeable in the field, and such variations are within the scope of the application. It is recognized that structured definition languages for the content of the application 107 other than XML can be used, as well as a plurality of different terminals 100, such as PC's, PDA's, kiosks, mobile devices. The terminals 100 can be deployed on wired and/or wireless network 104 topologies. For example, it is recognised that implementation of the system 10 can include a processing framework module for obtaining the application content; a provisioning module configured for utilising a provisioning API set for provisioning the application content; and an interpreter module configured for executing a set of provisioning instructions related to the application content, the provisioning instructions associated with the application for specifying selected ones of the provisioning API set.

The embodiments of the invention in which an exclusive property or privilege is claimed are defined as the follows:

1. A method for adaptive provisioning of an application on a terminal, the method executed on the terminal, comprising:

receiving at the terminal the application and associated provisioning instructions, the provisioning instructions specifying provisioning operations to be performed;

determining one or more application programming interfaces (APIs) stored at the terminal for execution at the terminal required to perform the provisioning instructions, each of the one or more APIs defining an interface for an API enabler to access an associated content type;

retrieving one or more API enablers stored at the terminal for execution at the terminal, each API enabler implementing a respective API and providing functionality required to provision the application, each of the one or more API enablers retrieved from a plurality of API enablers each implementing a respective API; and executing on the terminal the provisioning operations specified in the provisioning instructions, using the one or more API enablers, to provision the application in a runtime environment of the terminal.

2. The method according to claim 1, wherein provisioning of the application is shared between the runtime environment and the application through the associated provisioning instructions.

3. The method according to claim 1 wherein a provisioning service determines the one or more APIs required by the provisioning instructions.

4. The method according to claim 3 further comprising:

the provisioning service customizing the provisioning of the application using a provisioning API set;

the provisioning API set comprising a plurality of APIs specified in the provisioning instructions.

5. The method according to claim 4, wherein the provisioning service customizes the provisioning of a plurality of applications using one or more provisioning API sets.

6. The method according to claim 1, wherein the associated provisioning instructions are selected from the group comprising code, script, and configuration data.

7. The method according to claim 1, wherein the associated provisioning instructions are stored separately from the application.

8. The method according to claim 7 wherein receiving the provisioning instructions further comprises accessing a remote repository/database.

9. The method according to claim 8, wherein accessing includes querying a networked repository/database server.

10. The method according to claim 1, wherein the terminal is selected from the group comprising wired devices and wireless devices.

11. The method according to claim 1 wherein the API enabler is selected from the group comprising:

retrieved locally on the terminal by a provisioning service;

bundled with a content descriptor of the application; and retrieved remotely from the terminal by the provisioning service.

12. The method according to claim 1, wherein the APIs are defined by one or more entities to customize the provisioning process of the application according to requirements of the respective entity.

13. The method according to claim 1, wherein a script interpreter executes the provisioning operations, and each of the one or more API enablers exposes the respective API to the script interpreter, each API enabler implementing a service provider interface (SPI) to allow the API enabler to co-operate with the runtime environment to provide required functionality.

14. The method of claim 1, wherein each of the one or more API enablers is associated with a specific content type used in provisioning the application.

15. A terminal, including a computer processor and a computer readable storage memory, for adaptive provisioning of applications in a runtime environment, the terminal comprising:
- a provisioning service for provisioning an application received at the terminal associated with provisioning instructions, the provisioning instructions specifying provisioning operations defined by one or more application programming interfaces (APIs), each of the one or more APIs stored at the terminal for execution at the terminal defining an interface for an API enabler stored at the terminal for execution at the terminal to access an associated content type, the provisioning service retrieving one or more API enablers from a plurality of API enablers, each API enabler implementing a respective API of the one or more APIs and providing functionality required to provision the application; and
- a script interpreter for executing on the terminal the provisioning operations specified in the provisioning instructions using the one or more API enablers to provision the application in the runtime environment of the terminal.

16. The terminal according to claim 15, wherein provisioning of the application is distributed between the runtime environment and the application through the associated provisioning instructions.

17. The terminal according to claim 15, wherein the provisioning service is configured for customizing the provisioning of the application using a provisioning API set comprising a plurality of APIs specified in the provisioning instructions.

18. The terminal according to claim 17, wherein the provisioning service customizes the provisioning of a plurality of applications using one or more provisioning API sets.

19. The terminal according to claim 15, wherein the provisioning instructions are selected from the group comprising code, script, and configuration data.

20. The terminal according to claim 15, wherein the provisioning instructions are stored separately from the application.

21. The terminal according to claim 15, wherein the provisioning instructions are accessed from a remote repository/database.

22. The terminal according to claim 21, wherein the remote access of the provisioning instructions is performed by querying a network repository/database server.

23. The terminal according to claim 15, wherein the terminal is selected from the group comprising wired devices and wireless devices.

24. The terminal according to claim 15, wherein the API enabler is selected from the group comprising:
- retrieved locally on the terminal by a provisioning service;
- bundled with a content descriptor of the application; and
- retrieved remotely from the terminal by the provisioning service.

25. The terminal according to claim 15, wherein the provisioning instructions comprise a plurality of provisioning operations defined by one or more entities in order to allow a respective entity to customize the provisioning process of the application according to the requirements of the respective entity.

26. The terminal according to claim 15, wherein each of the one or more API enablers is associated with a specific content type used in provisioning the application.

27. The terminal according to claim 15, wherein the script interpreter executes the provisioning operations and each of the one or more API enablers expose the respective API to the script interpreter, each API enabler implementing a service provider interface (SPI) to allow the API enabler to co-operate with the runtime environment to provide the functionality required.

28. A computer program product embedded in a non-transitory computer readable medium storing instructions for execution by a terminal, the instructions for configuring the terminal to provide:
- a provisioning service for provisioning an application received at the terminal associated with provisioning instructions, the provisioning instructions specifying provisioning operations defined by one or more application programming interfaces (APIs) stored at the terminal, each of the one or more APIs for execution at the terminal defining an interface for an API enabler stored at the terminal for execution at the terminal to access an associated content type, the provisioning service retrieving one or more API enablers from a plurality of API enablers each API enabler implementing a respective API of the one or more APIs and providing functionality required to provision the application; and
- a script interpreter for executing on the terminal the provisioning operations specified in the provisioning instructions using the one or more API enablers to provision the application in the runtime environment of the terminal.

* * * * *